(12) United States Patent
Mercs et al.

(10) Patent No.: US 6,965,804 B1
(45) Date of Patent: *Nov. 15, 2005

(54) BUFFER MANAGEMENT SYSTEM FOR DIGITAL AUDIO

(75) Inventors: Laura Mercs, Huntington Beach, CA (US); Paul M. Embree, Irvine, CA (US); James S. Mercs, Huntington Beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/034,254

(22) Filed: Mar. 4, 1998

Related U.S. Application Data

(63) Continuation of application No. 08/936,236, filed on Sep. 24, 1997, now abandoned.

(51) Int. Cl.[7] ............. G06F 17/00; H04B 1/00
(52) U.S. Cl. ............................ 700/94; 381/119
(58) Field of Search ..................... 348/714–719, 348/722, 231.4; 386/96–106, 39; 84/600–604; 709/217, 219; 704/278; 700/94; 381/119, 381/61; 369/3, 4

(56) References Cited

U.S. PATENT DOCUMENTS

| | | | | |
|---|---|---|---|---|
| 5,745,645 | A | * | 4/1998 | Nakamura et al. .......... 386/111 |
| 5,999,906 | A | * | 12/1999 | Mercs et al. ................ 704/500 |
| 6,137,834 | A | * | 10/2000 | Wine et al. ................. 375/240 |
| 6,188,830 | B1 | * | 2/2001 | Mercs et al. ................. 386/52 |
| 6,301,429 | B1 | * | 10/2001 | Hirosawa ..................... 360/13 |
| 6,301,603 | B1 | * | 10/2001 | Maher et al. ................ 718/105 |
| 6,546,190 | B1 | * | 4/2003 | Phillips et al. ............... 386/65 |
| 6,771,881 | B1 | * | 8/2004 | Ketcham ..................... 386/55 |
| 2003/0045957 | A1 | * | 3/2003 | Haberman et al. ........... 700/94 |

* cited by examiner

*Primary Examiner*—Xu Mei
(74) *Attorney, Agent, or Firm*—Haverstock & Owens LLP

(57) ABSTRACT

A method and apparatus for buffer management for digital audio recording/playback wherein a digital signal processor, memory and appropriate interfacing facilitate storage and retrieval of digital audio data samples continuously across non-contiguous areas of memory to achieve substantially seamless flow of audio, as well as precise fade-in, fade-out and cross-fading between channel events, all as required in such critical synchronizing applications as film dubbing. A GUI interface and recorder controller communication with the processor, memory and a recording media may also be included.

29 Claims, 4 Drawing Sheets

BUFFER MANAGEMENT SYSTEM FOR DIGITAL AUDIO

RELATED APPLICATION

This application is a continuation of application Ser. No. 08/936,236, filed on Sep. 24, 1997 now abandoned.

BACKGROUND OF THE INVENTION

1. Field of the Invention

This invention relates generally to improvements in systems for buffer management and, more particularly, to a new and improved buffer management system for digital audio which facilitates substantially seamless flow of data samples.

2. Description of the Related Art

It is common practice in the recording/playback arts, i.e., those associated with film dubbing, musical recording and the like, to integrate plural channels of audio for mixing and/or editing the collective data base of audio information so that it is properly inserted in time synchronization with associated scenes on film or video tracks. Unfortunately, when handling multiple channels of audio simultaneously, "punching in" (directing audio input to be recorded) and "punching out"(directing audio signals to be provided as output) repetitively for both recording and playback, and with recording/playback of audio sequences in non-contiguous areas of memory, it has become difficult to smoothly fade between channels and obtain audio data flow which does not include audio "glitches" or artifacts due to mismatch or out of synch data samples. Many of these artifacts are due to individual and accumulated latencies inherent in the various subsystems and operational procedures associated with such film dubbing systems.

Hence, those concerned with the development and use of improved dubbing systems and the like have long recognized the need for improved systems for storage and retrieval of audio data from non-contiguous areas of memory while providing substantially seamless flow of such audio data, as well as having improved capability for smooth fading. The present invention clearly fulfills these needs.

SUMMARY OF THE INVENTION

Briefly, and in general terms, the present invention provides a new and improved memory management system wherein substantially seamless flow of data can occur across non-contiguous memory areas to mitigate artifacts. The invention also facilitates fade-in, fade-out and cross-fading among events in multiple channels of data. An event consists of the material between a punch-in command and its corresponding punch-out command. A play channel therefore consists of 2 subchannels with each subchannel being assigned alternating events. The subchannels are summed and played simultaneously to accomplish smooth cross-fading between recorded events.

By way of example, and not necessarily by way of limitation, the present invention provides a method and apparatus for buffer management for digital audio recording/playback wherein a digital signal processor, memory and appropriate interfacing facilitate storage and retrieval of digital audio data samples continuously across non-contiguous areas of memory to achieve substantially seamless flow of audio, as required in such critical synchronizing application as film dubbing. Selective gain control, at precisely selected times, over digital samples also enables precise fade-in, fade-out and cross-fading between channel events.

More particularly, the present invention may include a digital audio processor interfacing over appropriate address and bidirectional data flow lines to manage data in a memory subsystem via suitable buffer states and queues so that precise time synchronization, fading-in, fading-out and cross-fading between channels can be achieved with substantially seamless audio sample data flow. This is accomplished by selection of buffer states and adjustment of audio signal gain at appropriate times to implement the desired levels of fade-in, fade-out and cross-fading.

A recorder controller may also be included to provide messages to the digital audio processor and to manage memory and media data transfer. A GUI (Graphical User Interface), typically on the front panel of the recorder controller, may also be provided.

These and other objects and advantages of the invention will become apparent from the following more detailed description, when taken in conjunction with the accompanying drawings of illustrative embodiments.

DETAILED DESCRIPTION OF THE PREFERRED EMBODIMENTS

Figure 1:
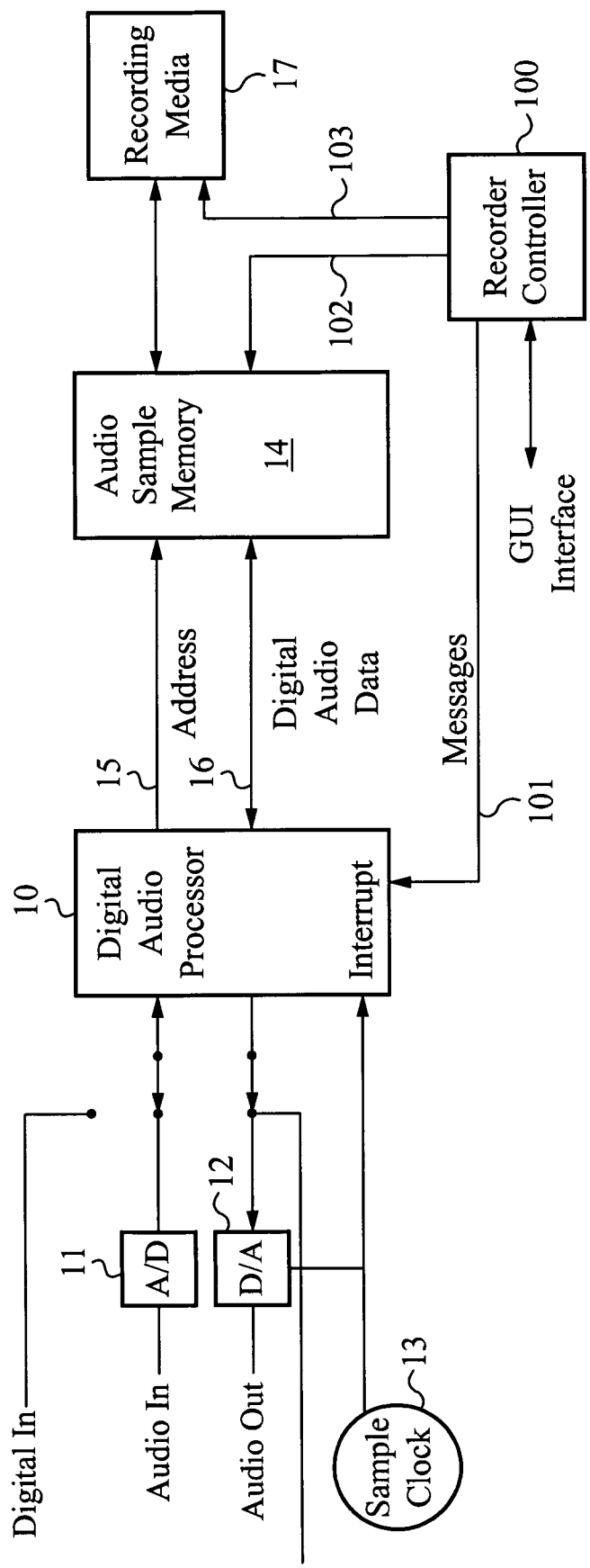
FIG. 1 is an overall block diagram illustrating a system in which the invention may be practiced.

Referring now to the drawings, like reference numerals denote like or corresponding parts throughout the drawing figures.

As best observed in FIG. 1, a digital signal processor, is utilized as a real-time digital audio processor 10, and includes a plurality of 32 bit floating point processors.

The processor 10 receives audio input either in direct digital audio format, typically at a sample rate of 44 KHz, 48 KHz or 96 KHz, or via an analog signal which is converted by an analog to digital converter 11. The digital audio processor 10 also provides audio output to a digital to analog converter 12 or to other digital devices. Audio input and output to and from the processor 10 is continuous. Input audio may be from a film dubber, music, communications, or the like. Output audio may be to film, tape, speakers and the like. In typical film dubbing applications, an operator will handle multiple channels of audio, simultaneously, by repetitively and selectively punching-in and punching-out on a studio control panel, for both recording and playback, to obtain the desired mix of audio for recording on the sound track of film or video.

The time stamps and their role in sample accurate management are further elaborated upon in related copending applications Ser. No. 08/936,639 entitled SAMPLE ACCURATE GPIO MANAGEMENT, inventors: Laura Mercs, Paul M. Embree and James S. Mercs, Ser. No. 08/936,237 entitled SAMPLE ACCURATE AUDIO STATE UPDATE, inventors: Laura Mercs, Paul M. Embree and James S. Mercs both filed concurrently with this application. The disclosures of both of these applications are hereby specifically incorporated by reference, and copies of these specifications are attached as Appendices A and B, respectively.

An audio sample memory 14, typically DRAM, interfaces with the digital audio processor 10 over an address line input 15 and a bidirectional digital audio data line 16. The DRAM memory of the memory subsystem 14 interfaces with a suitable recording media 17, such as a hard disc or the like, via an appropriate interface.

A recorder controller 100 may also be included. The controller 100 typically includes a GUI interface for interaction with an operator. The GUI interface may be conveniently located on the front panel of the controller 100, or in a suitable handheld device or the like. The recorder controller 100 provides control messages to the digital audio processor 10, over line 101, and also provides messages, over lines 102, 103 to manage the memory 14 and recording media 17, respectively.

The system shown in FIG. 1 enables management of digital audio samples stored in non-contiguous memory areas of the audio sample memory 14 so that recording and/or playback of digital audio from those non-contiguous areas of memory can be recorded and played back on command in substantially seamless fashion. While the system of FIG. 1 illustrates single channel flow in each direction, it is to be understood that this is for illustration purposes only, and a large number of multiple channels may be processed in the same manner without in any way departing from the spirit and scope of the invention. In this regard, fading-in, fading-out and cross-fading between events in multiple channels is accomplished by precisely timed increments of audio sample gain.

Figure 2:
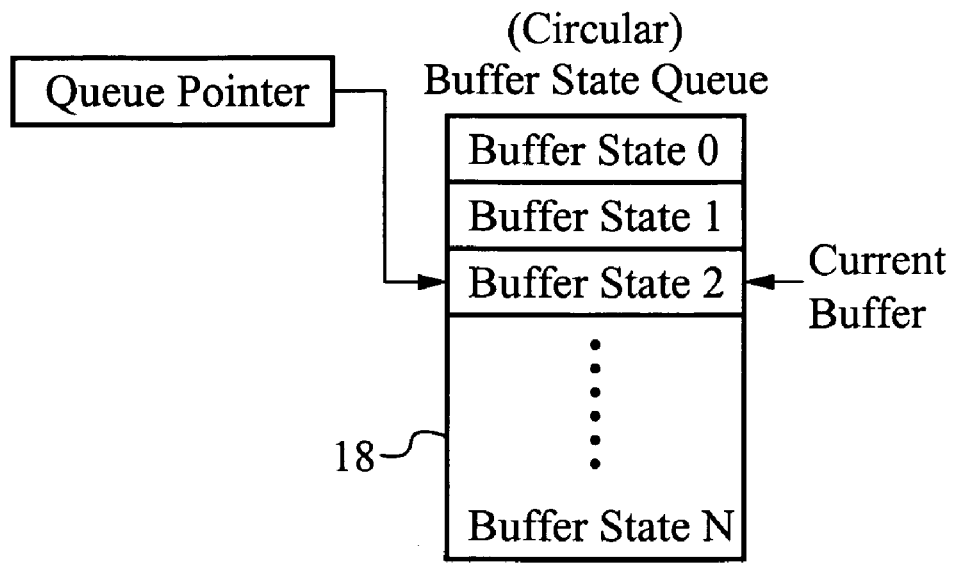
FIG. 2 is a block diagram illustrating a typical buffer state queue.

Referring now more particularly to FIG. 2, a circular buffer state queue table for the audio sample memory 14 is shown by queue state table 18 which illustrates buffer states 0, 1, 2 . . . buffer state N. A queue pointer designates the current buffer state which, in the illustration of FIG. 2, is buffer state 2. The buffer state queue pointer can move through states 0 . . . N and then back to 0 in the circular queue stack.

Figure 3:
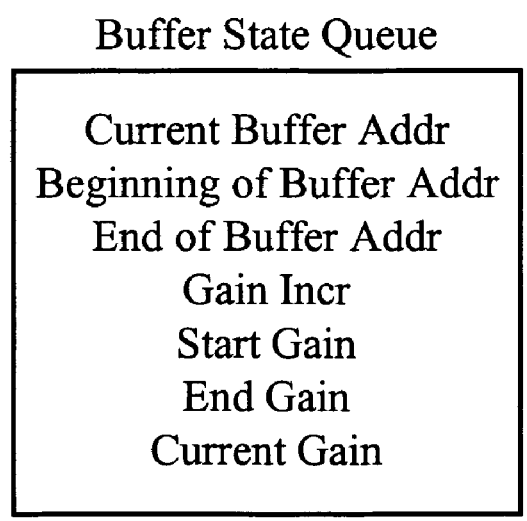
FIG. 3 illustrates typical play buffer states.

FIG. 3 illustrates a typical play buffer state table which includes the following information: current buffer address, beginning of buffer address, end of buffer address, the gain increment to be applied to a particular audio sample, audio gain at the start of the buffer, audio gain at the end of the buffer, and current audio gain associated with the current sample. This facilitates fade-in, fade-out and cross-fading between channel events at appropriate locations in the data stream. Record buffer states do not contain gain parameters since cross-fading is applied only during output. However, a constant input gain value may be applied to recorded samples as determined during calibration.

Figure 4A:
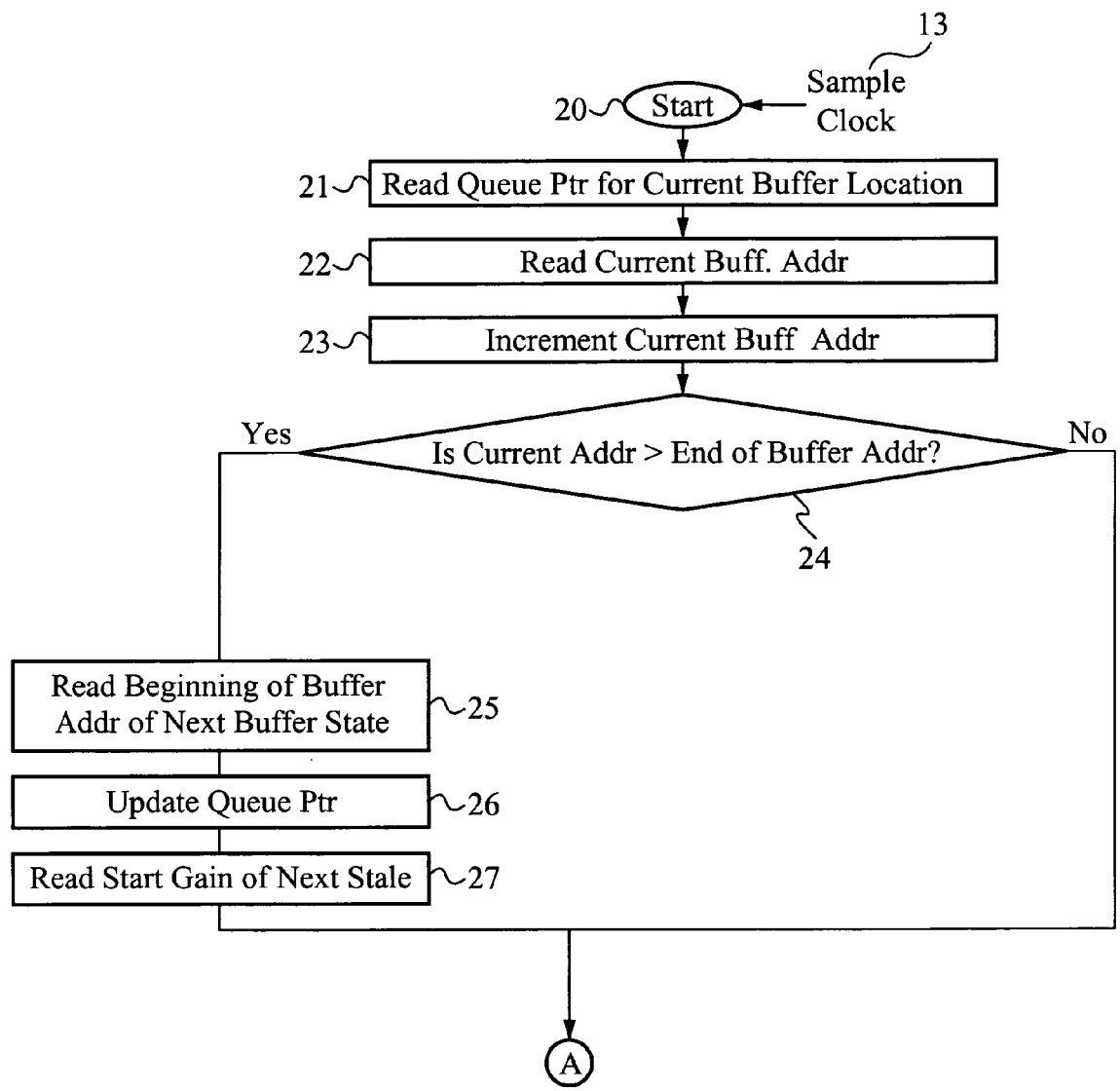
FIGS. 4a and 4b are flow charts illustrating the processing of information in accordance with the invention.
Figure 4B:
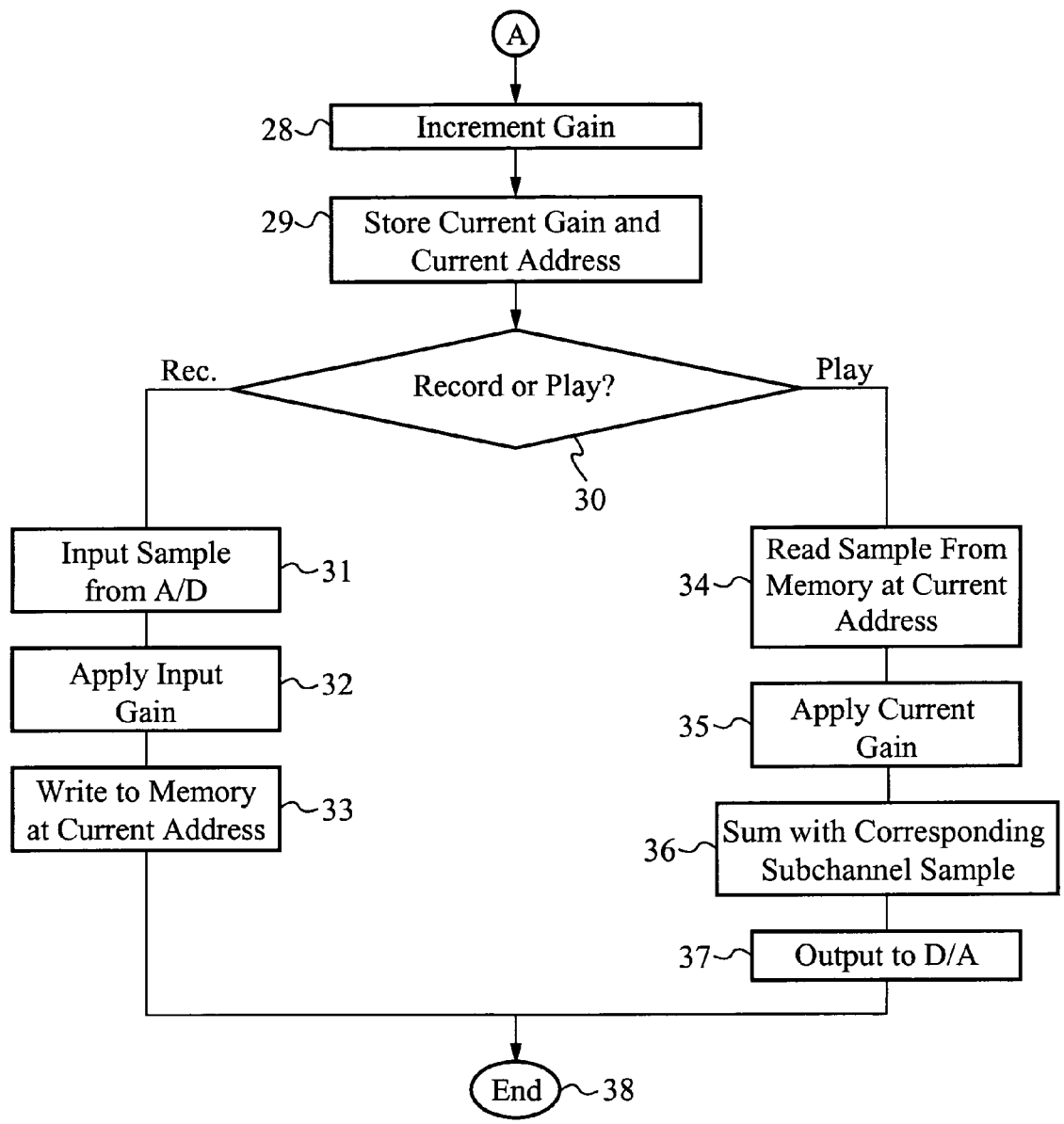

Referring now more particularly to FIGS. 4a and 4b, the application of the system of FIGS. 1–3 to achieve substantially seamless audio recording/playback and appropriate fading, in accordance with the present invention, is described.

As observed in FIG. 4a, the sample clock interrupt 13 initiates "start" at step 20. In step 21, the queue pointer for the buffer state queue table 18 is read for the current buffer location. In step 22, the current buffer address is read. In step 23, the current buffer address is incremented. In step 24, a determination is made whether or not the current buffer address is greater than the end of buffer address. If the latter determination is affirmative, step 25 is performed to read the beginning of the buffer address of the next buffer state. Next, the queue pointer is updated in step 26 and, at step 27, the starting audio gain of the next buffer state is read.

In step 28, the audio gain is incremented and, in step 29, both the current gain and the current address are stored.

In step 30, the decision is made to either "record" or "play". If the decision is to "record", then step 31 is performed to receive an input sample from the audio source. Next, an input calibration gain may be applied to the audio sample in step 32 and the sample written to the memory 14 over lines 15 and 16 at the current address, all via step 33, thus ending the recording routine.

For play subchannels, step 34 is performed to read the audio sample from the memory 14 at the current address. In step 35, the current gain is applied to the selected audio sample. In step 36, the play subchannels are summed. In step 37, the digital audio sample is provided as output to complete the playback routine at step 38. The increments of gain facilitate the previously described fade-in, fade-out and cross-fading between channel events.

If, in FIG. 4a, the decision in step 24 is negative regarding the determination as to whether or not the current address is greater than the end of buffer address, then steps 25, 26 and 27 are bypassed and the routine goes directly to step 28 for incrementing audio gain.

Additional steps may be included for packing or unpacking the desired audio bit resolutions (i.e., 16, 20, 24, or 32 bit) into or out of the DRAM memory word size. The address increment may be dynamically changed on a sample by sample basis by a rate controller filter to alter the play rate. In that case, switching between buffers must insure that the desired "step" between samples is maintained. The increment will be negative when playing in reverse. In that case the current address is compared to the beginning address and if less, the previous buffer state is selected.

Hence, the present invention satisfies a long existing need in the art for improved systems for storage and retrieval of audio data from non-contiguous areas of memory while providing substantially seamless flow of such audio data, as well as precise fade-in, fade-out and cross-fading between channel events.

It will be apparent from the foregoing that, while particular forms of the invention have been illustrated and described, various modifications can be made without departing from the spirit and scope of the invention. Accordingly, it is not intended that the invention be limited, except as by the appended claims.

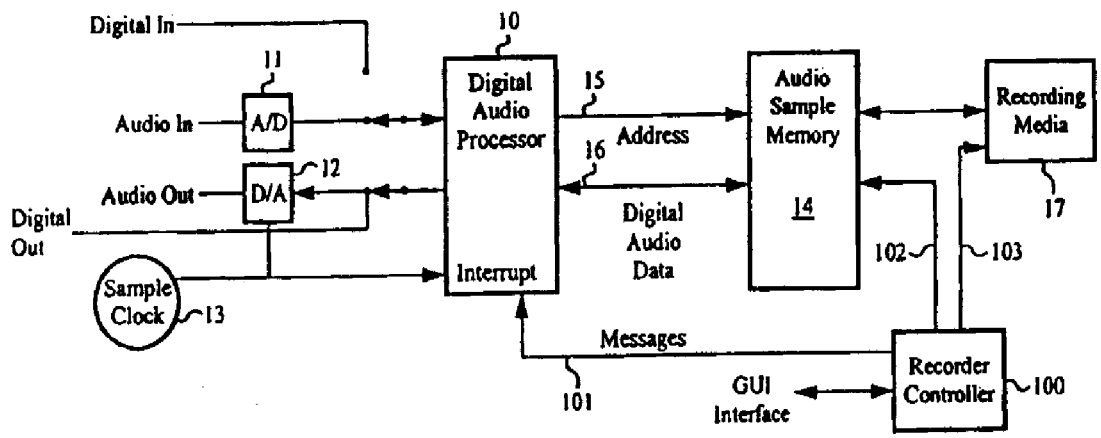

We claim:

1. In a system for processing digital audio signals, the combination comprising:
   a digital signal processing subsystem, including a digital signal input and a digital signal output;
   a memory interconnected with said digital signal processing subsystem;
   means for providing data to and accessing data from non-contiguous areas of said memory to provide substantially seamless flow of audio signals, wherein said data is associated with time codes; and
   means for selectively varying audio gain for fading.

2. In a system for processing digital audio signals, the combination comprising:
   a digital signal processing subsystem, including a digital signal input and a digital signal output;
   a memory subsystem interconnected with said digital signal processing subsystem;
   a recorder controller interfacing with said processing subsystem and said memory subsystem;
   means for providing data to and accessing data from non-contiguous areas of said memory subsystem in synchronization with other data to provide substantially seamless flow of audio signals, whereby the effects of system latencies upon seamless flow are minimized.

3. A system for processing digital signals as set forth in claim 2, wherein said memory subsystem includes DRAM.

4. A system for processing digital signals as set forth in either of claim 2 or 4, wherein said data is synchronized with other external data.

5. A system for processing digital signals as set forth in either of claim 2 or 3, wherein said data is synchronized with video.

6. A system for processing digital signals as set forth in either of claim 2 or 3, wherein said data is synchronized with film.

7. A system as set forth in either claim 2 or 3, and further including:
means for selectively varying audio gain for fading.

8. In a system for processing digital audio signals, the combination comprising:
a digital signal processing subsystem, including a digital signal input and a digital signal output;
a memory subsystem interconnected with said digital signal processing subsystem;
means for selectively varying audio gain; and
interface means for providing data to and accessing data from non-contiguous areas of said memory subsystem in synchronization with other data to provide substantially seamless flow of audio signals, wherein said data is associated with time codes,
whereby signal fading-in and fading-out is facilitated while the effects of system latencies upon seamless flow are minimized.

9. A system for processing digital audio signals as recited in claim 8, wherein said other data is video.

10. A system for processing digital audio signals as recited in claim 8, wherein said other data is film.

11. A system for processing digital audio signals as recited in claim 8, wherein said memory subsystem includes DRAM.

12. A system for processing digital signals as set forth in claim 8, wherein said time codes are SMPTE time codes.

13. A method for processing digital audio signals, comprising:
receiving an audio signal input;
directing and storing said audio signal input in a memory;
accessing data from non-contiguous areas of said memory in synchronism with other data to provide substantially seamless flow of audio signals;
selectively varying gain of said audio signal for fading; and
monitoring time codes associated with said audio signal input,
whereby the effects of system latencies upon seamless flow are minimized.

14. A method as recited in claim 13, wherein said other data is video.

15. A method as recited in claim 13, wherein said other data is film.

16. A method as set forth in either of claim 13, 14, or 15, wherein said audio signal is a digital signal.

17. A method as set forth in either of claim 13, 14, or 15, wherein said audio signal is an analog signal which is converted to a digital signal.

18. A method as recited in claim 13, wherein said time codes are SMPTE time codes.

19. A system for processing digital signals as recited in any of claim 1, 2 and 3, and further including:
means for recording data from said memory.

20. A system for processing digital signals as recited in any of claim 1, 2 and 3, and further including:
means for playing back data from said memory.

21. A system for processing digital signals as recited in any of claim 1, 2 and 3, and further including:
means for simultaneously recording and playing back data from said memory.

22. A system for processing digital signals as recited in either of claim 1 or 2, and further including:
means for fading-in and fading-out between samples of data.

23. A system for processing digital signals as recited in either of claim 1 or 2, and further including:
means for cross-fading between streams of data.

24. A system for processing digital audio signals as recited in any of claim 1 or 8–11, 12, and further including:
a recorder controller interfacing with said processing subsystem and said memory subsystem.

25. A system for processing digital audio signals as recited in any of claim 1 or 8–11, 12, and further including:
a recorder controller interfacing with said processing subsystem and said memory subsystem; and
a GUI interface for said recorder controller.

26. In a system for processing digital audio signals, the combination comprising:
a digital signal processing subsystem, including a digital signal input and a digital signal output;
a memory subsystem interconnected with said digital signal processing subsystem;
means for selectively varying audio gain; and
interface means for providing data to and accessing data from said memory subsystem in synchronization with other data to provide substantially seamless flow of audio signals,
whereby signal fading-in and fading-out is facilitated while the effects of system latencies upon seamless flow are minimized and wherein said data is associated with time codes.

27. A method for processing digital audio signals, comprising:
receiving an audio signal input;
directing and storing said audio signal input in a memory;
accessing data from said memory in synchronism with other data to provide substantially seamless flow of audio signals;
selectively varying gain of said audio signal; and
monitoring time codes associated with said audio signal input,
whereby the effects of system latencies upon seamless flow are minimized.

28. In a system for processing digital audio signals, the combination comprising:
a digital signal processing subsystem, including a digital signal input and a digital signal output;
a memory subsystem interconnected with said digital signal processing subsystem;
a recorder controller interfacing with said processing subsystem and said memory subsystem;
means for selectively varying audio gain; and
interface means for providing data to and accessing data from non-contiguous areas of said memory subsystem in synchronization with other data to provide substantially seamless flow of audio signals,
whereby signal fading-in and fading-out is facilitated while the effects of system latencies upon seamless flow are minimized.

29. The system for processing digital audio signals as recited in claim 2 further comprising a GUI interface for said recorder controller.

* * * * *

UNITED STATES PATENT AND TRADEMARK OFFICE
CERTIFICATE OF CORRECTION

PATENT NO.    : 6,965,804 B1                                               Page 1 of 2
DATED         : November 15, 2005
INVENTOR(S)   : Laura Mercs, Paul M. Embree and James S. Mercs It is certified that error appears in the above-identified patent and that said Letters Patent is hereby corrected as shown below:

Delete title page consisting of Fig. 1 and replace with the attached title page.

Drawings,
Fig. 1, should read as follows:

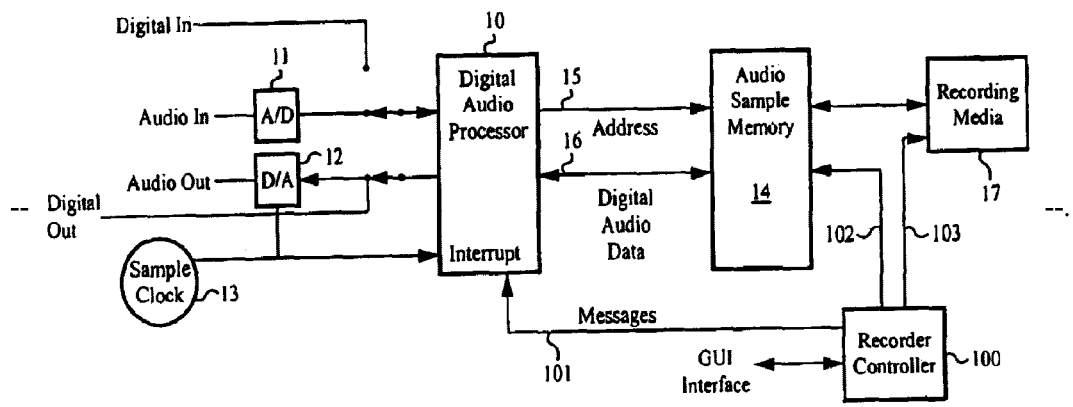

Fig. 1

Column 5,
Line 6, replace "4" with -- 3 --.

Signed and Sealed this

Sixteenth Day of May, 2006

JON W. DUDAS
*Director of the United States Patent and Trademark Office*

United States Patent
Mercs et al.

(10) Patent No.: US 6,965,804 B1
(45) Date of Patent: *Nov. 15, 2005

(54) BUFFER MANAGEMENT SYSTEM FOR DIGITAL AUDIO

(75) Inventors: Laura Mercs, Huntington Beach, CA (US); Paul M. Embree, Irvine, CA (US); James S. Mercs, Huntington Beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/034,254

(22) Filed: Mar. 4, 1998

Related U.S. Application Data

(63) Continuation of application No. 08/936,236, filed on Sep. 24, 1997, now abandoned.

(51) Int. Cl.$^7$ .......................... G06F 17/00; H04B 1/00
(52) U.S. Cl. ....................................... 700/94; 381/119
(58) Field of Search ............................. 348/714–719, 348/722, 231.4; 386/96–106, 39; 84/600–604; 709/217, 219; 704/278; 700/94; 381/119, 381/61; 369/3, 4

(56) References Cited

U.S. PATENT DOCUMENTS

| | | | |
|---|---|---|---|
| 5,745,645 A | * 4/1998 | Nakamura et al. | 386/111 |
| 5,999,906 A | * 12/1999 | Mercs et al. | 704/500 |
| 6,137,834 A | * 10/2000 | Wine et al. | 375/240 |
| 6,188,830 B1 | * 2/2001 | Mercs et al. | 386/52 |
| 6,301,429 B1 | * 10/2001 | Hirosawa | 360/13 |
| 6,301,603 B1 | * 10/2001 | Maher et al. | 718/105 |
| 6,546,190 B1 | * 4/2003 | Phillips et al. | 386/65 |
| 6,771,881 B1 | * 8/2004 | Ketcham | 386/55 |
| 2003/0045957 A1 | * 3/2003 | Haberman et al. | 700/94 |

* cited by examiner

*Primary Examiner*—Xu Mei
(74) *Attorney, Agent, or Firm*—Haverstock & Owens LLP

(57) ABSTRACT

A method and apparatus for buffer management for digital audio recording/playback wherein a digital signal processor, memory and appropriate interfacing facilitate storage and retrieval of digital audio data samples continuously across non-contiguous areas of memory to achieve substantially seamless flow of audio, as well as precise fade-in, fade-out and cross-fading between channel events, all as required in such critical synchronizing applications as film dubbing. A GUI interface and recorder controller communication with the processor, memory and a recording media may also be included.

29 Claims, 4 Drawing Sheets